United States Patent [19]

McLaughlin

[11] 3,766,529

[45] Oct. 16, 1973

[54] COMPUTER-COMPATIBLE TAPE AND READING SYSTEM THEREFOR

[75] Inventor: Paul McLaughlin, Hythe, Southampton, England

[73] Assignee: Racal-Thermionic Limited, Hythe, Southampton, Hampshire, England

[22] Filed: Mar. 17, 1972

[21] Appl. No.: 235,720

Related U.S. Application Data

[63] Continuation-in-part of Ser. No. 17,060, March 6, 1970, abandoned.

[52] U.S. Cl. .......................... 340/172.5, 235/151.11
[51] Int. Cl. ........ G06f 7/00, G06f 7/28, G06f 15/46
[58] Field of Search ...................... 340/172.5; 408/3; 235/151.11; 179/100.2 MD

[56] References Cited

UNITED STATES PATENTS

| | | | |
|---|---|---|---|
| 2,972,736 | 2/1961 | Hersh | 340/174.1 |
| 3,016,522 | 1/1962 | Lourie et al. | 340/174.1 |
| 3,439,346 | 4/1969 | McGee | 340/172.5 |
| 3,443,178 | 5/1969 | Reuteler | 318/18 |
| 3,482,230 | 12/1969 | Girling | 340/174.1 |
| 3,579,195 | 5/1971 | Hallmark et al. | 340/172.5 |
| 3,626,266 | 12/1971 | Sindelar et al. | 318/572 |

OTHER PUBLICATIONS

R. A. Skov and E. G. Newman, IBM Technical Disclosure Bulletin, "Buffer System," Vol. 2, No. 5, Feb. 1960, pp. 86–89.

*Primary Examiner*—Gareth D. Shaw
*Assistant Examiner*—James D. Thomas
*Attorney*—Robert J. Lasker et al.

[57] ABSTRACT

A system for controlling machines repetitively. It uses blocks of data bits fed through a command chain from the machine to the tape reader. The command chain comprises a tape reader, a bit store and a character assembler which produces characters for "instructing" the machine. When empty, it originates a signal to cause data to be read out to the bit store; and likewise, when the data in the bit store has fallen to a pre-set level, a signal is originated to the tape reader to read out a further block of data. The data blocks are arranged to be read out by transporting the tape first in one direction and then in the reverse direction, with each two blocks to be read consecutively in either direction having interposed therebetween a block which is to be read in the opposite direction.

16 Claims, 7 Drawing Figures

COMPUTER-COMPATIBLE TAPE AND READING SYSTEM THEREFOR

This Application is a continuation-in-part of my earlier Application Ser. No. 17,060, filed Mar. 6, 1970, and entitled "Computer-Compatible Tape and Reading System Therefor", now abandoned.

The invention of this Application relates to a system for machine control more particularly, for controlling a machine performing a sequence of operations respectively.

Existing systems for repetitive control of machines, especially machines requiring a large number of instructions, are not entirely satisfactory. For instance, they commonly employ a loop of tape i.e. an endless tape, and because of mechanical limitations imposed by the techniques for handling such a tape, the length of tape has to be limited and is often inadequate for the amount of data needed repetitively to instruct a machine.

It is an object of this invention to provide a system for controlling a machine performing a sequence of operations repetitively, which overcomes the limitation of existing systems on the amount of data that can be used.

Briefly, the invention records the data on a suitable open-ended tape in a succession of blocks of word bits so that the blocks are read out by transporting the tape first in one direction and then in the reverse direction, with each two blocks to be read consecutively in either direction having interposed therebetween a block which is to be read in the opposite direction. The tape reader, in any one direction of tape transport, therefore, reads a block and then traverses a block without reading it until the tape is to be reversed.

Because the tape is open ended, it can be transported past a reading head by a conventional two-spool tape transport and this virtually eliminates any limitation on the length of tape and thus on the amount of data that can be used.

Other objects and advantages of the invention will appear from the following description of the invention in conjunction with the accompanying drawings in which.

Figure 1:
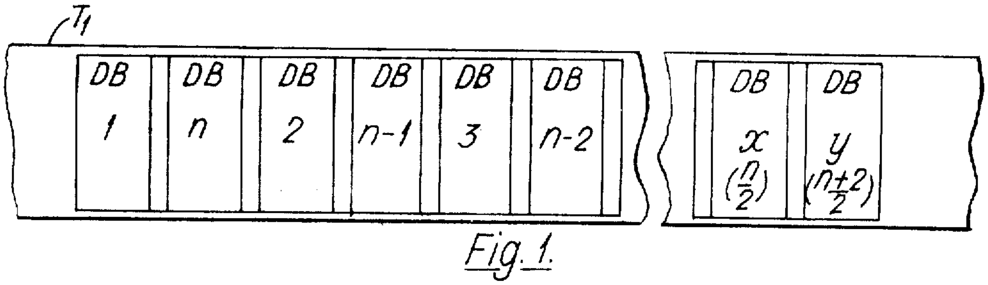
FIGS. 1 to 4 are diagrammatic representations of respective computer compatible tapes according to the invention.
Figure 2:
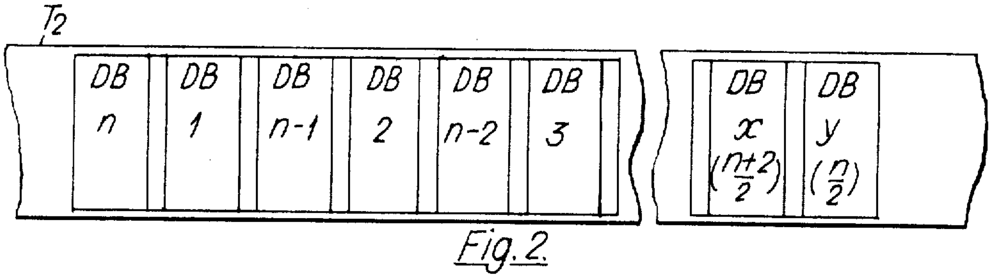
Figure 3:
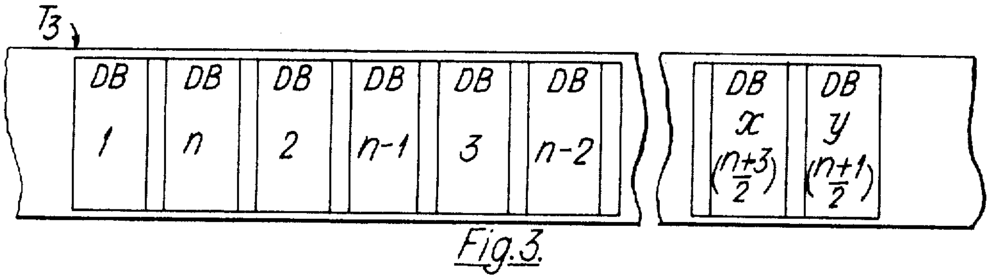
Figure 4:
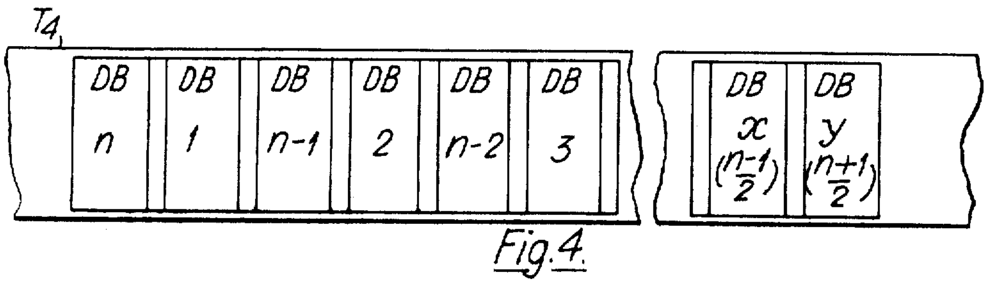
Figure 5:
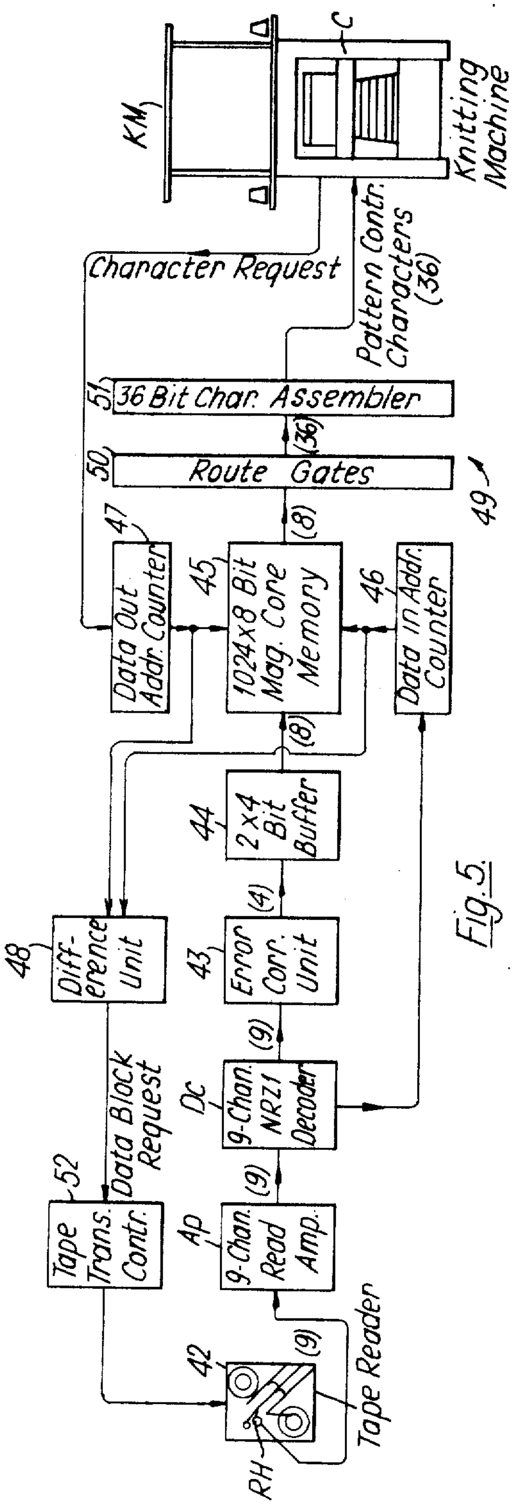
FIG. 5 is a block diagram of an embodiment of the system according to the invention, for use with any of the tapes of FIG. 1.

The machine of the system of FIG. 5 is intended to be used with a circular jacquard kntting machine. Since the machine itself is conventional, it will be described only in so far as it is necessary for an understanding of the present invention.

In the embodiment of FIG. 5, the data representing the instruction according to which the working of the machine is to be controlled, is recorded on tape and the tape then used as the source of instruction to the machine. The tape will be recorded in a standard computer format. This format specifies:

a. Type of recording (e.g., NRZI)

b. Number of bits per character (across the tape).

c. Spacing of the characters on the tape.

d. Number of Characters in a block (this may be variable).

e. Size of Inter-block gap.

f. Any checking or control characters.

The tape data consists of groups of words making up a complete block where a word is a number (less than 36) of bits employed in making up a 36 bit character by which the machine is instructed to perform a given operation. In the embodiment, data are read from the tape block by block by a suitable reading device, into a bit store, and the data are taken from the store by a character assembler which assembles the data bits into 36 bit instruction characters for feeding to the knitting machine. The bit store is large enough to take more than one block of data so that read out from the store need not be interrupted by the presence of the inter-block gap which occurs on the tape. In the starting condition of the apparatus of the embodiment, the tape is stationary with the read head positioned within an inter-block gap, and the bit store and the character assembler are empty. In response to this condition, the bit store originates a data request signal to actuate the tape reader to cause a complete block of data to be read from the tape into the bit store, and then the tape to be stopped at the inter-block gap before the next block to be read. The empty character assembler likewise produces a data request signal which is fed to the bit store to actuate the latter so that when a complete block of data has been read into the bit store, the bit store reads out data to the character assembler to enable the latter to assemble a 36 bit character. The apparatus is then ready to instruct the knitting machine. The knitting machine is provided with a control mechanism to respond to and implement instruction from the character assembler; and on activation of the machine, the control mechanism produces a character request signal which is fed to the character assembler to cause the latter to read out a character to the control mechanism of the knitting machine. On completing a read out in this manner, the character assembler repeats its data request signal and more data is read out from the bit store to the character assembler. When by this process, the data in the bit store falls below a predetermined amount, the bit store again originates its signal as described hereinbelow to the tape reader and as a result a further data block is read out from the tape to the bit store. The machine may be stopped simply by deactivating the apparatus but in this case in order to avoid loss of any data in the bit store when the machine is stopped, the bit store needs to be a non-volatile store e.g., one employing memory cores. Alternatively, the machine can be "inched" to a stop so that de-activation is delayed to permit the machine to continue to run until the bit store is emptied, and the apparatus arranged to inhibit the data request signal of the bit store during inching of the machine. The alternative imposes no limitation as to the type of bit store employed, and the bit store and the inhibition may be provided by the use of delay lines.

Since the knitting machine operates according to a repeated sequence of instructions, the data on the tape need to be read out repetitively. This is provided for by recording the data on a specially written computer tape to enable the tape reader to use a normal reversible two spool tape transporter.

The data blocks constituting the sequence of instructions may be regarded as forming a sequence of blocks 1 to $n$; and in writing the computer tape, the blocks are written on to the tape in the order:

1, $n$, 2, $n$-1, 3, $n$-2 — $x$, $y$; or $n$, 1, $n$-1, 2 etc., where $x$ and $y$ are respectively $n/2$, $n + 2/2$ or $n + 2/2$, $n$ as the case may be, when $n$ is even, and $n + 3/2$, $n + 1/2$ or $n - 1/2$, $n + 1/2$ as the case may be, when $n$ is odd.

In addition, a unique identification or "tag" character may be recorded before alternate blocks 1 to $n/2$ when $n$ is even, and $n - 1/2$ or $n + 1/2$ as the case may be when $n$ is odd and following the end of each alternate block $n$ to $n + 2/2$ when $n$ is even or $n + 1/2$ or $n + 3/2$ as the case may be when $n$ is odd for detecting ends of the blocks but it is preferred in the embodiment to avoid this as will be described below. It is preferred also to write alternate blocks $n$ to $n + 2/2$ or $n + 1/2$, $n + 3/2$ as the case may be, in reverse order to avoid having to reverse the order of the bits in the block after read out from the tape.

It may here be mentioned that if, in using the specially written tape, the tag characters are used, they provide a check signal the effect of which is to ensure correct reading of the tape, that is, so that only alternate blocks starting with the first block are read into the store in succession, and so that the tape is reversed when the last block in one direction of reading has been reached whereby in reading out the entire data on the tape, the tape is automatically brought back to the data-starting point. In using the preferred form of the reader as described below, the tape is read out in the same manner but as already mentioned this is achieved without the use of tag signals. It will be understood that block $y$ may be the first of the blocks to be read in the reverse direction. Tape reversal may be effected by using a conventional "end of file" mark or preferably by arranging for the tape drive automatically to reverse after loss of data for a certain length of tape. The read out of alternate blocks increases the effective interblock gap length but this may be compensated for by increasing the capacity of the bit store.

It will be evident from the above that two arrangements of the data blocks are possible for each of the two cases respectively when $n$ is even and $n$ is odd. These four arrangements are shown in FIGS. 1 to 4. Referring now to those Figures, the tapes $T_1$, $T_2$ of FIGS. 1 and 2 respectively have an even number of data blocks DB whereas the tapes $T_3$, $T_4$ of FIGS. 3 and 4 respectively have an odd number of blocks. In tape $T_1$, the sequence starts with data block 1 and continues as follows: $n$, 2, $n-1$, 3, $n-2$ — $x$, $y$ where $n$ is the number of blocks and $x$ and $y$ respectively are $n/2$ and $n + 2/2$. In this case, block $y$ is the first block to be read in the reverse direction of the tape. In tape $T_2$, the sequence starts with data block $n$ and continues as follows 1, $n-1$, 2, $n-2$, 3, — $x$, $y$ where $x$ and $y$ respectively are $n + 2/2$ and $n/2$; block $x$ in this case being the first block to be read in the reverse direction. In tape $T_3$, the arrangement is analogous to tape $T_1$, but because of the odd number, the block $n + 3/2$ (block $x$) is the first block to be read out in the reverse direction whereas in tape $T_4$, which is analogous to tape $T_2$, block $n + 1/2$ (block y) is the first block to be read out in the reverse direction.

All the tapes of the invention are read out in the same manner viz: the tape reader reads block 1, traverses but does not read the next block (block $n$ or $n-1$ as the case may be) and then stops the tapes with the reading head in the interblock gap before block 2. As will be explained below the reader is then actuated by a data request signal to repeat a similar reading operation i.e., in respect of block 2 and block $n-1$ or $n-2$ as the case may be. This operation is then repeated until block $x$ or $y$ as the case may be is read. The tape is then reversed and the remaining alternate blocks read out in the same manner as blocks 1 to $x$ or $y$.

Although the embodiment of FIG. 5 may use any of the above described block arrangements on the tape, for ease of description, it will be assumed in the following description that the tape referred to uses the block arrangement of tape $T_2$ above.

The system of the embodiment (FIG. 5) employs a ½ inch reversible, fast start-stop, bidirectional magnetic tape reader 42 precisely similar to that employed as a data source for digital computers, such as is disclosed in U.S. Pat. No. 3,016,522. The data are pre-recorded on the tape by a computer in a form prescribed by the international standards relating to data interchange on ½ inch magnetic tape with 800 rows or bytes per inch of length of the tape.

The data are written on the tape so that the blocks 1, 2 etc. to be read in the first direction of reading are written in the forward direction, viz: with the information which is required earliest written nearest the beginning of the block, and so that the remaining blocks to be read in the reverse direction are written in the reverse direction viz: with the information which is required earliest written at the end of the block, namely, the end furthest from the beginning-of- tape mark.

Two control characters may be written at the end of each block as required by the above mentioned standards, although they would play no part in the present invention.

The data blocks on the tape consist of bytes of nine bits in each of which one bit is the odd parity of the other eight bits. These eight bits are arranged into four information bits and four check bits. Each of the check bits is the odd parity of a selection of three of the data bits. It will be understood that in an odd parity arrangement, all the bits having the value 1 (including the odd parity bit) should equal an odd number. Consideration of the implications of this code will reveal that although any bit can be in error, the error can be detected, identified, and the correct values of the data bits deduced because of the odd parity. It is also possible to detect a double error although such an error cannot be corrected.

The data read from the tape by the reader 12 is fed to an error detection and correction circuit 43 constructed from conventional electronic logic modules via amplifier Ap of nine channels and a nine-channel decoder Dc. Each byte read from the tape emerges from circuit 43 as a four-bit corrected word which passes to a four-wide, two long shift register 44 which acts as a temporary or buffer store for two corrected words. From this store, the two four-bit words are fed to a bit store 45 to form, which may be termed for convenience, a core word that is, a word of eight bits.

The bit store is a 1,024 word by eight bit magnetic core store as commonly employed in small digital controllers. Two corrected words may be stored in each of 1,017 of its locations; four of the remaining locations ($CL_1 - 4$ see FIG. 6) are used for memorising control functions, and the rest consisting of three locations are left idle.

Associated with the bit store are two counters which control the addressing of the core memory. One counter 46 is used to control, in sequence, the locations into which pairs of corrected words from the buffer store may be written and the other counter 47 controls the locations from which information is taken to feed the knitting machine indicated generally at KM. The difference between the numbers stored in the two counters is detected by difference unit 48 and represents the amount of unused information in the bit store 45, and when this difference falls to a predetermined level the tape reader, through a tape transport control 52, is instructed by the difference unit to read the next block. This is how a "Data Block Request" signal is generated.

The tape reader in its preferred form responds to loss of data so that the tape is stopped after reading any one block, in the interblock gap before the next block to be read. This is easily arranged by conventional electronic techniques since the tape is transported at a constant speed and since the lengths of a block and of the interblock gap are known. The tape is thus stopped at fixed intervals of time which can be determined beforehand. A restriction in the programming of the tape, in this instance, requires that there must be an even number of data blocks on the tape. Hence the last block in any one direction is read subsequent to a data block request, and the reader continues to transport tape while a search for the next block is made. After a predetermined time when no block is found, the transport direction is reversed. Apart from this reversal the sequence is unaltered, and the next block to be encountered, i.e., that which has just been read, is traversed without being read and the transport stops with the read head RH in the same interblock gap as it was before the last data block request signal was received. The reader then passes the tape backwards under the command of data block requests until the beginning of the tape is reached, when a similar reversal process takes place.

The knitting machine KM is a 36 feeder machine, which means that yarns are fed in at 36 stations spaced around the machine. needless arriving at a feeder (now shown) may be commanded electromagnetically to either pull a loop of yarn to the outside of the fabric (called a "knit" command) or not (non-knit). In the former case a stitch of the yarn colour appears on the patterned side of the knitted fabric; by performing large numbers of such selections as the machine rotates the pattern is formed as the fabric is knitted.

Since there are 36 feeders on the machine the information required to control the machine is in the form of characters of 36 bits each. As the machine turns a new character is required for each needle that passes any fixed point on the machine. In the machine in question there are nearly 2,000 needles, and the design speed of the machine is 30 revolutions per minute. Hence it may be seen that up to 1,000 characters per second, depending on the machine speed, may be required.

Figure 6:
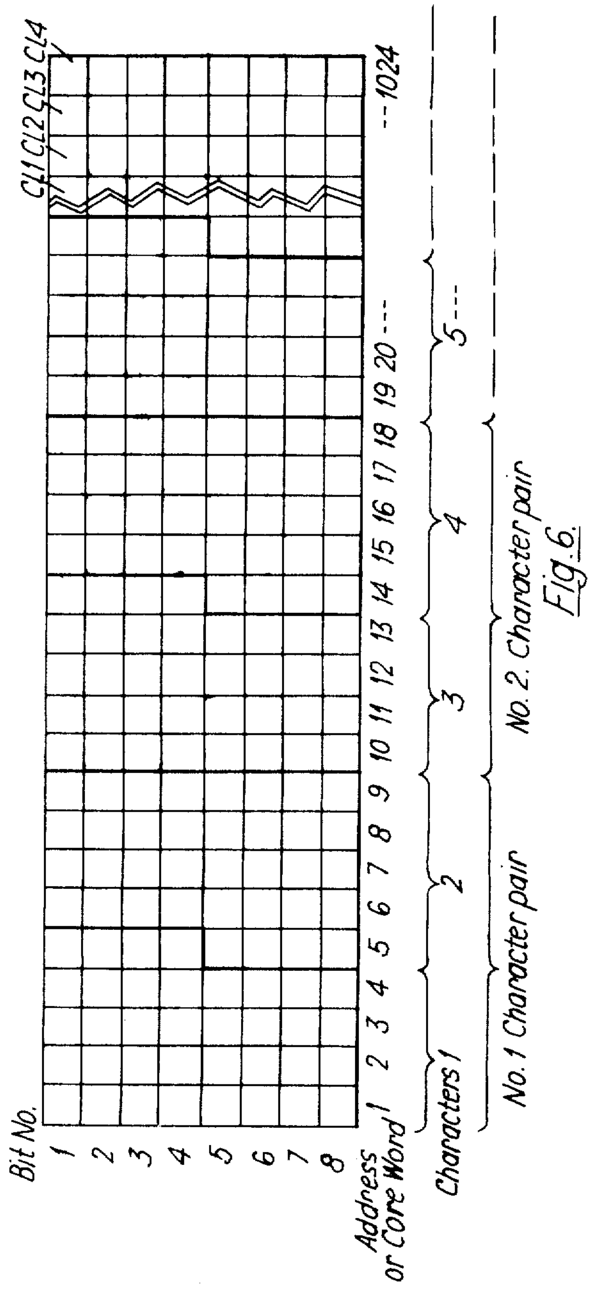
FIG. 6 is a diagram of the organisation of data in a bit storage device employed in the embodiment of FIG. 5.
Figure 7:
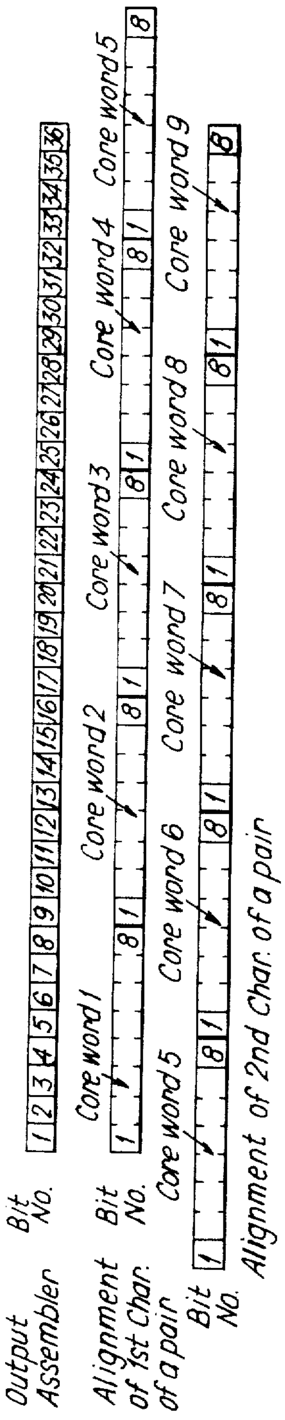
FIG. 7 is a diagram of the organisation of data in a character assembler employed in the embodiment of FIG. 5.

The eight-bit core memory 45 is organised so that the data out counter 47 can address blocks of nine successive core words (see FIG. 6). Each such block contains two output characters i.e., of 36 bits, and the address counter commands either of such a pair of characters to be read out of the core memory to the character assembler 49. The character assembler comprises a gating device 50 consisting of two rows of routing gates, and a 36-bit integrated circuit memory 51. If the first one of a character pair is read out of the core memory, one set of routing gates directs the first core word to bits 1 to 8 of the output assembler (see FIG. 7), the second core word to bits 9 to 16 of the assembler and so on until the first four bits of core word 5 are routed to bits 33 to 36 of the assembler; this word is rewritten in the assembler as in its original location in the core. When the second one of a character pair is read, the second set of routing gates is used. Bits 5 through 8 of the fifth core word in the sequence of nine such words are routed to assembler bits 1 to 4, word 6 is routed to bits 5 to 12 and so on until the ninth word in the set is routed to assembler bits 29 through 36. Thus, it may be seen that the first character of a pair occupies four and a half core words, and the second occupies a half and four core words.

This routine is carried out for each character that is required by the machine. Character request signals are generated by an incremental position encoder (not shown) geared to the machine cylinder C.

The states of the two address counters 46, 47 are stored and updated in two of the control locations CL in the core memory previously described; the other two of the control locations CL are used to store and update a count of the interblock gap in which the read head RH of the tape reader is currently residing. In the event of a shutdown of power these pieces of information are stored and retained in the core memory; on restoration of power they are retrieved and the address counters restored to the state they held immediately prior to the shutdown. Since the serial number of the interblock gap is known the tape can be spooled to a beginning-of-tape mark, and blocks of information counted until the correct gap is found. The entire apparatus is then ready to continue its work as if no break had occurred. The serial number of the interblock gap is called the Tape Location Count.

The above method eliminates the need for tag or identification characters, so the entire code range of the tape is available for information. This makes the programming of the computer which writes the tapes very much easier than if such characters were required. It should be noted that the Tape Location Count increases when the tape is being transported in a forward direction and reduces when the tape is being transported in the reverse direction.

In the above description of the invention, reference has been made to an electronic system but it should be understood that the invention is also applicable to equivalent pneumatic systems.

Further, although the above embodiments have described with reference to a knitting machine, it may usefully be employed in any application where a repetitive sequence of instructions is required.

I claim:

1. A system for controlling a machine performing a sequence of operations repetitively according to programmed digital computer data recorded on open-ended tape as a succession of interlaced blocks in computer format, in which instructioncharacters for the operations of the machine are constituted by a combination of data bits less in number than the number of data bits in a block of data but more than the number of data bits in a byte of a block of data; the system comprising:

1. means for reading alternate blocks in a first direction of tape transport and then the remaining blocks in reverse successive order in the opposite direction of tape transport; the reading means comprising a multi-channel read head for reading all the bits of any byte simultaneously in any block being read, and decoding means for arranging the bits in each byte so read in the order in which they were recorded on the tape, to form a word consisting of a given order of data bits, whereby the reading means reads out a block of data as a plurality of data bit words;
2. a bit storage arrangement comprising:
   a bit store constituted by a magnetic core matrix, to receive words read out by the reading means,
   a first means for counting and addressing in data bits to the bit store in the order in which the bits were recorded on the tape,
   a second means for counting and addressing out data bits from the bit storage; and
   means responsive to the difference in count between said first and said second counting means for actuating the reading means to read a further block of data when the data previously read into the store stand at a predetermined amount; said second counting means addressing at any one time, when the predetermined amount of data is in the store, at least one grouping of data words therein which make up the bits of an instruction character; and
3. a character assembler comprising a memory for assembling therein the bits of a grouping of data words received from bit store to form an instruction character for the machine; the assembler being responsive to the read out of an instruction character therefrom to actuate the bit storage arrangement to read out a further grouping of data words therefrom;

whereby repeated reading of the entire succession of data blocks instructs the machine to effect a complete sequence of operations repetitively.

2. A system according to claim 1, wherein the bit storage has a capacity of more than a block of data, and is such as to actuate the reading means when the bits in the bit store fall below a pre-set number, so that the bit storage can be operated without interruption of read out thereof due to the interval between reading of one data block and the next data block.

3. A system according to claim 1, wherein the data are stored in the bit storage as core words each consisting of a plurality of bit words as read out from the reading means.

4. A system according to claim 3, wherein the data are fed to the bit storage as four-bit words grouped in pairs.

5. A system according to claim 4, wherein each pair of four bit words is stored in the bit storage to constitute a single core word of eight bits.

6. A system according to claim 5, wherein the bit storage is one providing at least 1,024 × 8 data bit locations.

7. A system according to claim 3, wherein the core words are held in the bit storage in pairs of groups thereof with each group constituting the data which make up an instruction character to the machine.

8. A system according to claim 7, wherein said bit storage arrangement further includes routing gates for reading out either of the groups in a pair first from said bit store.

9. A system according to claim 8, wherein said routing gates include logic gates to route the pairs of groups of core words from the bit store to the character assembler in the order in which the groups were read out from the bit storage.

10. A system according to claim 3, wherein the core words are stored in groups each consisting of four and one-half core words.

11. A system according to claim 10, wherein the character assembler is a 36 bit assembler and receives a group of four and one-half core words to asemble each character.

12. A system for controlling a machine performing a sequence of operations repetitively according to programmed digital computer data recorded on an open-ended tape in computer format, in which instruction characters for the operations of the machine are constituted by a combination of data bits less in number than the number of bits in a block of data but more than the number of bits in a byte of a block of data, and in which each byte of the blocks recorded on the tape comprises a group of data bits and a group of check bits each of which with a different selection of the data bits gives a predetermined parity; the system comprising:

1. means for reading alternate blocks in one direction of tape transport and then the remainder of the blocks in reverse successive order in the opposite direction of tape transport; the reading means comprising a multi-channel read head for reading all the bits of any byte simultaneously, decoding means for arranging the bits in each byte in the order in which they were recorded on the tape, and an error detection and correction circuit adapted to detect and correct any single error in any byte by the summation of each selection of the data bits with the check bit concerned to form a word consisting of a given order of the data bits corrected for any single error;
2. a bit storage arrangement comprising a bit store to receive data words from the reading means and having a capacity of at least a block of data; the bit storage arrangement actuating the reading means as required to read a block of data from the tape; and
3. a character assembler comprising a memory for assembling therein data bits read out from the bit storage to form an instruction character for the machine; the assembler being responsive to the read out of an instruction character from the memory thereof to actuate the bit storage to read out the bits of a further instruction character; whereby repeated reading of the entire succession of the data blocks instructs the machine to effect a sequence of operations repetitively.

13. A system according to claim 12, wherein the reading means is adapted to read blocks recorded in bytes each of a number of bits one of which bits is the odd parity of the remainder, and the remainder of which bits consists of a group of data bits and a group of check bits, the check bits being the odd parity of a selection of the data bits.

14. A system according to claim 13, wherein the number of bits in a byte is nine including the bit which is the odd parity of the remaining; and wherein each byte comprises four of the data bits and four of the check bits.

15. A system for controlling a machine performing a sequence of operations repetitively according to programmed digital computer data recorded on an open-ended tape as a succession of interlaced blocks in computer format; the system comprising:

1. a reading means for reading alternate blocks of data in a first direction of tape transport and then reading the remaining blocks in reverse successive order in the opposite direction of tape transport; the reading means comprising a multi-channel head for reading the bits of any byte of a block of data simultaneously, and decoding means for arranging the bits in each byte so read in the order in which they were recorded on the tape, to form a word consisting of a given order of data bits, whereby the reading means reads out a block of data as a plurality of data bit words; and the reading means operating automatically to read one block of data at a time and then stop the tape with the read head in the interblock gap before the next block of data to be read;
2. a bit storage arrangement comprising a bit store to receive data words from the reading means and having a capacity of at least one block of data and providing additional bit locations to control tape operation, said bit store retaining in said additional bit locations data defining the location of said reading means along said tape, whereby a block that is next to be read in either direction of tape transport can be ascertained; and the bit storage arrangement actuating the reading means as required to read a block of data from the tape; and
3. a character assembler comprising a memory for assembling therein data bits read out from the bit storage to form an instruction character for the machine; the assembler being responsive to the read out of an instruction character from the memory thereof to actuate the bit storage to read out the bits of a further instruction character; whereby repeated reading of the entire succession of data blocks instructs the machine to effect a sequence of operations repetitively.

16. A system according to claim 15, wherein the bit storage comprises non-destructive memory elements to store the bits so that when the apparatus is deactivated, any data still remaining in the store is preserved.

* * * * *